United States Patent
Cha et al.

(10) Patent No.: US 11,310,015 B2
(45) Date of Patent: Apr. 19, 2022

(54) METHOD FOR TRANSMITTING AND RECEIVING REFERENCE SIGNAL AND DEVICE THEREFOR

(71) Applicant: LG ELECTRONICS INC., Seoul (KR)

(72) Inventors: Hyunsu Cha, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/047,630

(22) PCT Filed: Apr. 16, 2019

(86) PCT No.: PCT/KR2019/004556
§ 371 (c)(1),
(2) Date: Oct. 14, 2020

(87) PCT Pub. No.: WO2019/203526
PCT Pub. Date: Oct. 24, 2019

(65) Prior Publication Data
US 2021/0160022 A1    May 27, 2021

Related U.S. Application Data

(60) Provisional application No. 62/659,063, filed on Apr. 17, 2018.

(51) Int. Cl.
*H04W 72/10*    (2009.01)
*H04L 5/00*    (2006.01)
*H04W 72/00*    (2009.01)

(52) U.S. Cl.
CPC ............ *H04L 5/005* (2013.01); *H04L 5/0023* (2013.01); *H04W 72/005* (2013.01); *H04W 72/10* (2013.01)

(58) Field of Classification Search
CPC ..... H04W 72/10; H04W 72/04; H04W 72/06; H04W 72/08; H04W 72/048;
(Continued)

(56) References Cited

U.S. PATENT DOCUMENTS 11,019,518 B2 * 5/2021 Babaei ................. H04W 24/10
2018/0083680 A1 * 3/2018 Guo ...................... H04L 5/0048
(Continued)

FOREIGN PATENT DOCUMENTS

WO    2018056728    3/2018

OTHER PUBLICATIONS

PCT International Application No. PCT/KR2019/004556, International Search Report dated Aug. 6, 2019, 19 pages.
(Continued)

*Primary Examiner* — Phong La
(74) *Attorney, Agent, or Firm* — Lee Hong Degerman Kang Waimey

(57) ABSTRACT

Disclosed is a method for a terminal to receive a reference signal in a wireless communication system. In particular, the method comprises: receiving information informing of a mode associated with a repetitive use of a beam for a channel state information-reference signal (CSI-RS); and receiving a synchronization signal/physical broadcast channel (SS/PBCH) block and the CSI-RS multiplexed on the basis of the mode, wherein the reception priority for the SS/PBCH block is higher than the reception priority for the CSI-RS.

11 Claims, 21 Drawing Sheets

(A) CONTROL-PLANE PROTOCOL STACK (B) USER-PLANE PROTOCOL STACK

(58) Field of Classification Search
CPC .... H04W 72/005; H04W 72/00; H04L 5/005; H04L 5/0048; H04L 5/0051; H04L 5/0016; H04L 5/0023; H04L 5/0025; H04B 7/0413; H04B 7/0697
See application file for complete search history.

(56) References Cited

U.S. PATENT DOCUMENTS

| | | | | |
|---|---|---|---|---|
| 2018/0199328 A1* | 7/2018 | Sang | ................. | H04W 36/06 |
| 2018/0220406 A1* | 8/2018 | Mizusawa | ............... | H04B 7/04 |
| 2018/0310317 A1* | 10/2018 | Wigren | ............... | H04B 7/0456 |
| 2018/0323848 A1* | 11/2018 | Mizusawa | ............ | H04W 16/28 |
| 2019/0013858 A1* | 1/2019 | Kakishima | ........... | H04B 7/0417 |
| 2019/0052334 A1* | 2/2019 | Jeon | ................... | H04J 13/0062 |
| 2019/0058519 A1* | 2/2019 | Davydov | ............... | H04L 5/006 |
| 2019/0110300 A1* | 4/2019 | Chen | ................. | H04L 5/0048 |
| 2019/0159264 A1* | 5/2019 | Zhang | ................. | H04W 16/28 |
| 2019/0200249 A1* | 6/2019 | Yoon | .................... | H04L 5/0057 |
| 2019/0239245 A1* | 8/2019 | Davydov | ............. | H04W 16/28 |
| 2019/0254042 A1* | 8/2019 | Cirik | ................. | H04W 74/004 |
| 2020/0059921 A1* | 2/2020 | Karjalainen | ......... | H04B 7/0632 |
| 2020/0067674 A1* | 2/2020 | Guan | ....................... | H04L 5/00 |
| 2020/0099492 A1* | 3/2020 | Shi | ....................... | H04W 24/10 |
| 2020/0120521 A1* | 4/2020 | da Silva | ................ | H04L 5/0048 |
| 2020/0128561 A1* | 4/2020 | Akkarakaran | ...... | H04W 72/042 |
| 2020/0244503 A1* | 7/2020 | Bala | ................... | H04L 27/2613 |
| 2020/0305140 A1* | 9/2020 | Song | .................. | H04W 72/042 |

OTHER PUBLICATIONS

Huawei, et al., "Remaining issues on RS multiplexing," 3GPP TSG RAN WG1 Meeting #92bis, R1-1803704, Apr. 2018, 4 pages.
CATT, "On multiplexing of signals and physical channels," 3GPP TSG RAN WG1 Meeting #92bis, R1-1803741, Apr. 2018, 7 pages.
Samsung, "Issues on RS multiplexing," 3GPP TSG RAN WG1 Meeting #92bis, R1-1804364, Apr. 2018, 2 pages.
Mediatek Inc., "Remaining issues on multiplexing," 3GPP TSG-RAN WG1 Meeting #92bis, R1-1804073, Apr. 2018, 2 pages.

* cited by examiner (A) CONTROL-PLANE PROTOCOL STACK (B) USER-PLANE PROTOCOL STACK (a)

(b)

METHOD FOR TRANSMITTING AND RECEIVING REFERENCE SIGNAL AND DEVICE THEREFOR

CROSS-REFERENCE TO RELATED APPLICATIONS

This application is the National Stage filing under 35 U.S.C. 371 of International Application No. PCT/KR2019/004556, filed on Apr. 16, 2019, which claims the benefit of U.S. Provisional Application No. 62/659,063, filed on Apr. 17, 2018, the contents of which are all hereby incorporated by reference herein in their entirety.

TECHNICAL FIELD

The present disclosure relates to a method and apparatus for transmitting and receiving a reference signal (RS), and more particularly, to a method and apparatus for, when channel state information-reference signal (CSI-RS) resource sets having different configurations or a CSI-RS and a synchronization signal/physical broadcast channel (SS/PBCH) block are multiplexed, transmitting and receiving an RS according to the transmission/reception priority of the CSI-RS and/or the SS-PBCH block and a related transmission/reception beam sweeping operation.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure devised to solve the conventional problem is to provide a method and apparatus for transmitting and receiving a reference signal (RS).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of receiving a reference signal (RS) by a user equipment (UE) in a wireless communication system includes receiving information indicating a mode related to repetition of a beam for a channel state information-reference signal (CSI-RS), and receiving the CSI-RS and a synchronization signal/physical broadcast channel (SS/PBCH) block which are multiplexed based on the mode. A reception priority of the SS/PBCH block is higher than a reception priority of the CSI-RS.

The UE may perform reception beam sweeping for a plurality of symbols including the SS/PBCH block.

Further, the mode may be for indicating that a base station (BS) does not use the same beam repeatedly to transmit the CSI-RS.

Further, the UE may include one antenna panel.

Further, channel state measurement may not be based on the CSI-RS.

Further, the SS/PBCH block and the CSI-RS may be multiplexed in frequency division multiplexing (FDM).

Further, when a subcarrier spacing for the SS/PBCH block is equal to or larger than a predetermined integer multiple of a subcarrier spacing for the CSI-RS, the reception priority of the SS/PBCH block may be identical to the reception priority of the CSI-RS.

Further, when a signal for a reception priority configuration is received from a BS, the reception priorities of the SS/PBCH block and the CSI-RS may be determined based on the received signal.

According to the present disclosure, a UE for receiving an RS in a wireless communication system includes a transceiver and at least one processor coupled with the transceiver. The at least one processor is configured to control the transceiver to receive information indicating a mode related to repetition of a beam for a CSI-RS, and control the transceiver to receive the CSI-RS and an SS/PBCH block which are multiplexed based on the mode. A reception priority of the SS/PBCH block is higher than a reception priority of the CSI-RS.

According to the present disclosure, an apparatus for receiving an RS in a wireless communication system includes a memory and at least one processor coupled with the memory. The at least one processor is configured to receive information indicating a mode related to repetition of a beam for a CSI-RS, and receive the CSI-RS and an SS/PBCH block which are multiplexed based on the mode. A reception priority of the SS/PBCH block is higher than a reception priority of the CSI-RS.

According to the present disclosure, a method of transmitting an RS by a BS in a wireless communication system includes transmitting information indicating a mode related to repetition of a beam for a CSI-RS, and transmitting the CSI-RS and an SS/PBCH block which are multiplexed based on the mode. A reception priority of the SS/PBCH block is higher than a reception priority of the CSI-RS.

According to the present disclosure, a BS for transmitting an RS in a wireless communication system includes a transceiver and at least one processor coupled to the transceiver. The at least one processor is configured to control the transceiver to transmit information indicating a mode related to repetition of a beam for a CSI-RS, and control the transceiver to transmit the CSI-RS and an SS/PBCH block which are multiplexed based on the mode. A reception priority of the SS/PBCH block is higher than a reception priority of the CSI-RS.

Advantageous Effects

According to the present disclosure, a beam sweeping operation may be efficiently performed to transmit and receive a synchronization signal/physical broadcast channel (SS/PBCH) block and a channel state information-reference signal (CSI-RS).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
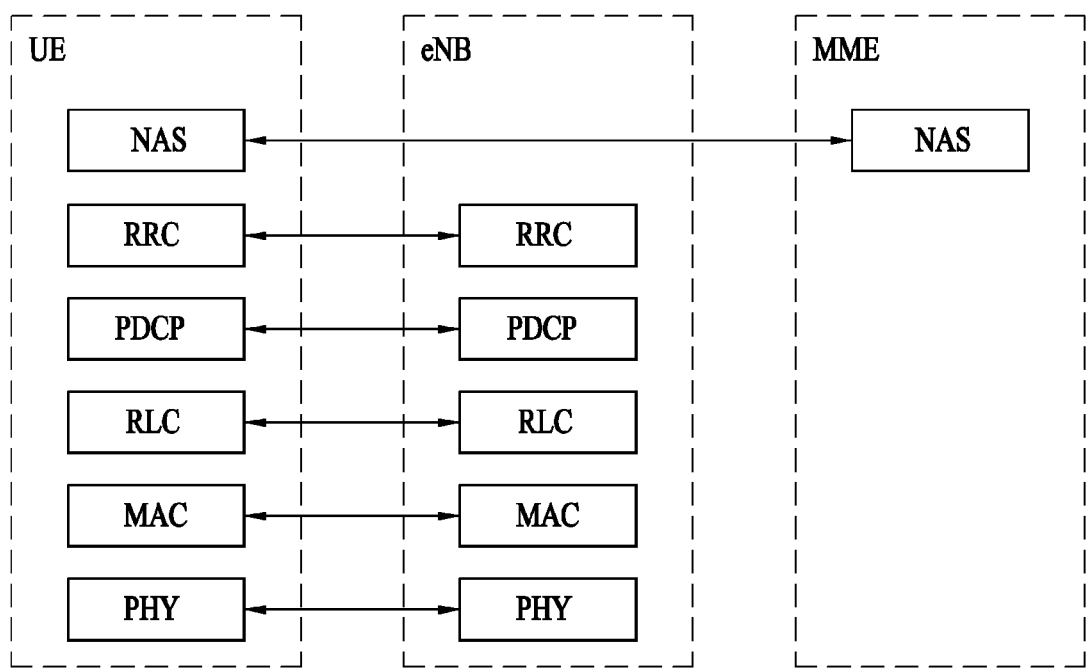
FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
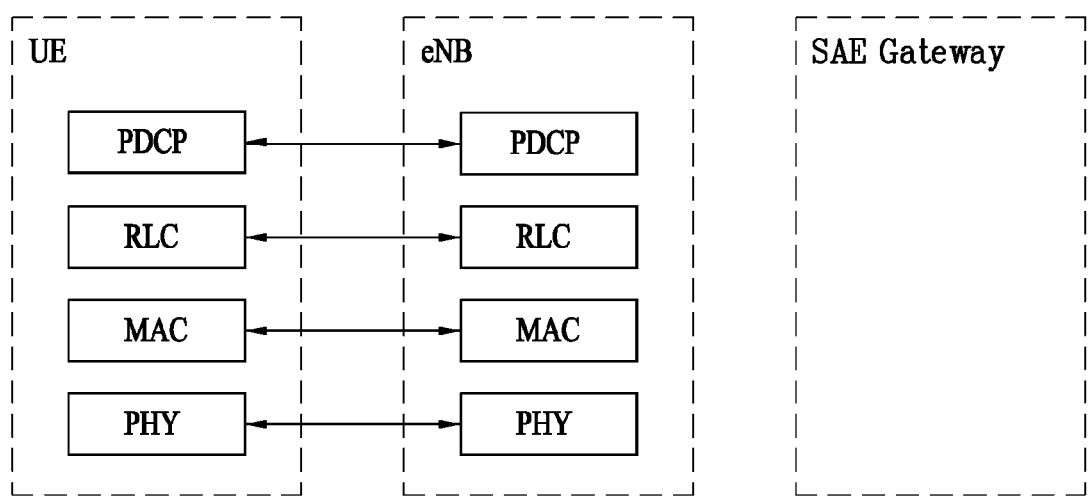

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
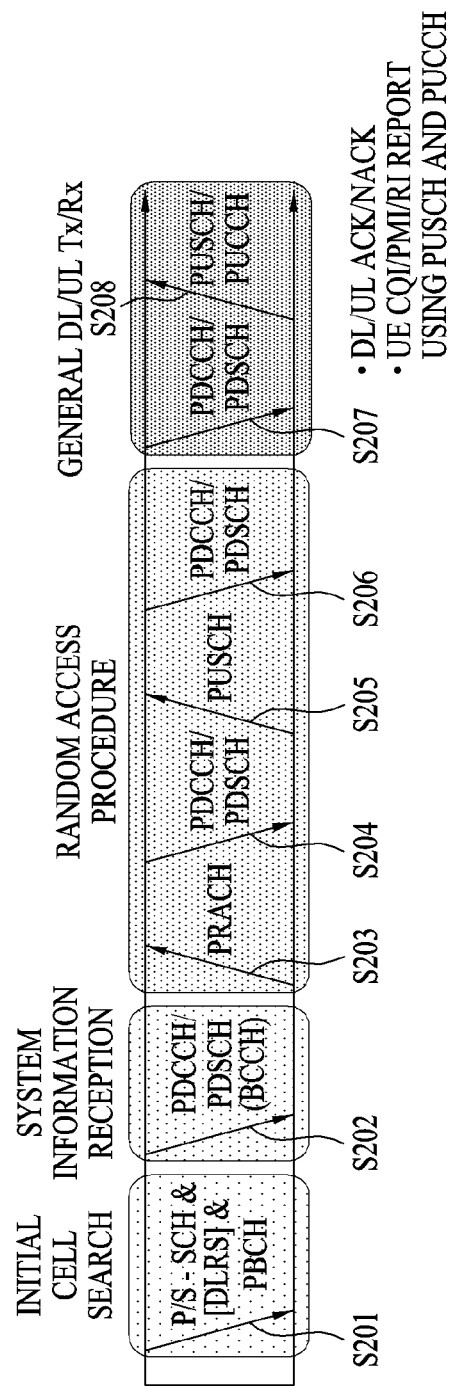
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
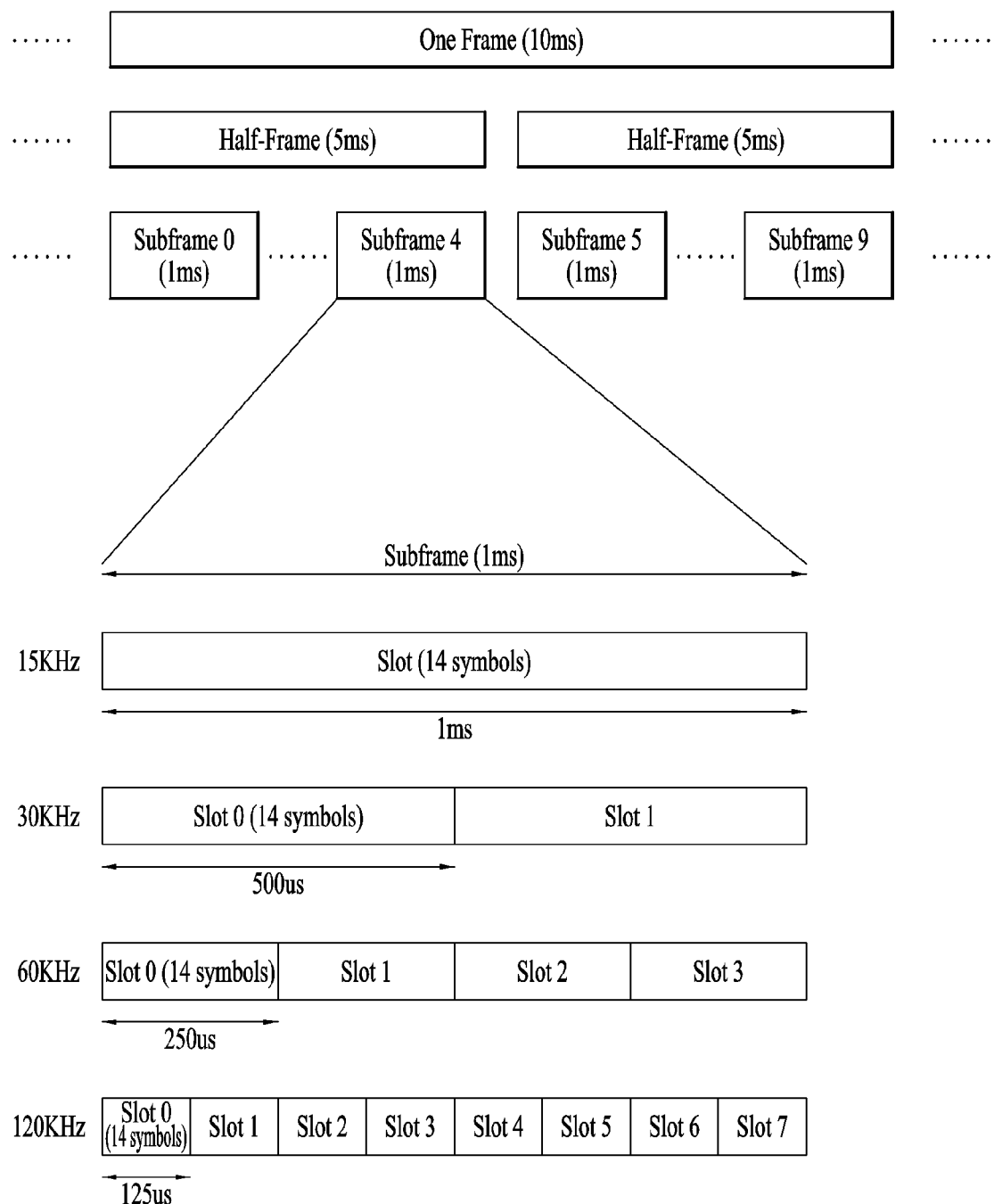
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

Figure 4:
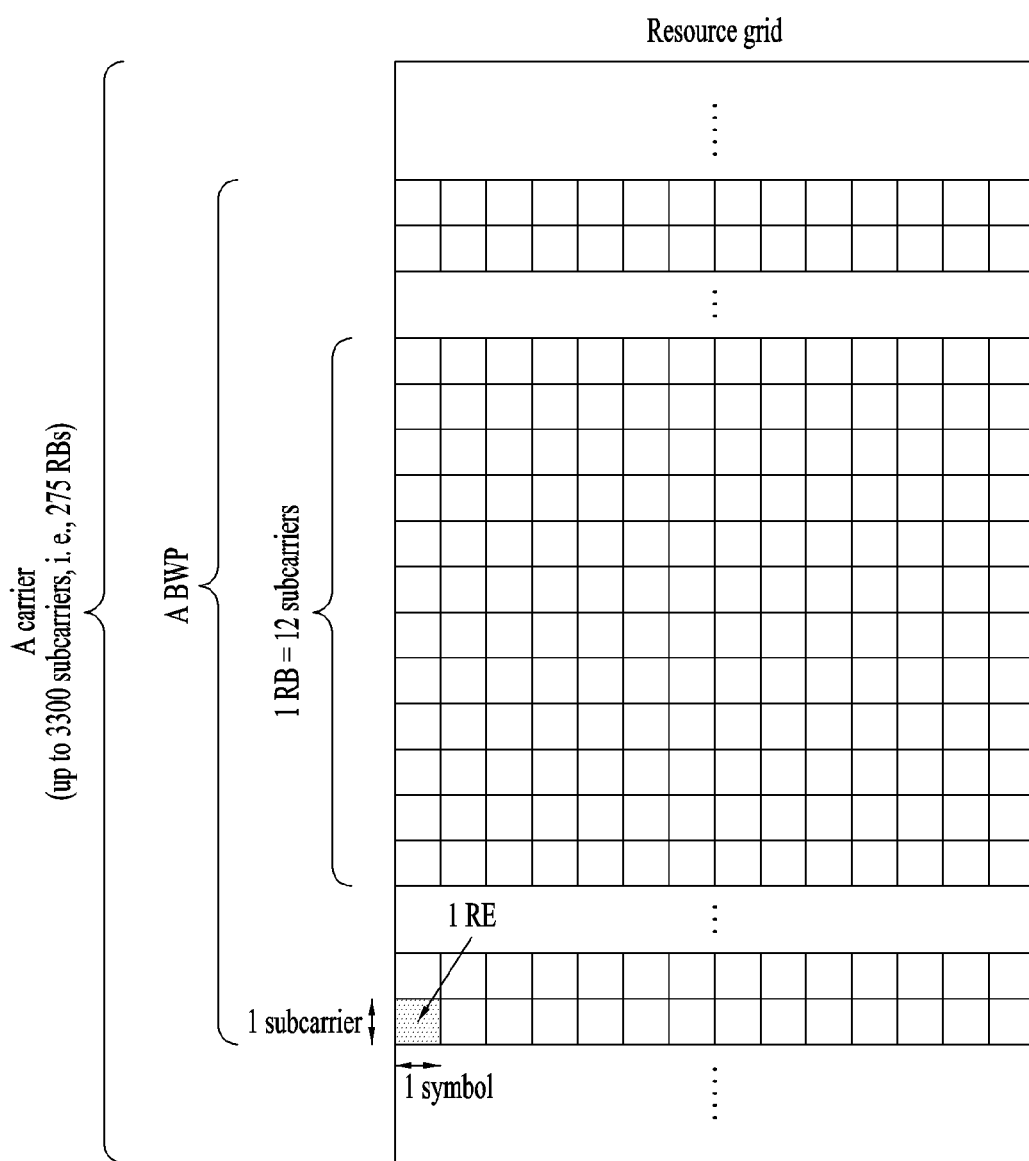

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
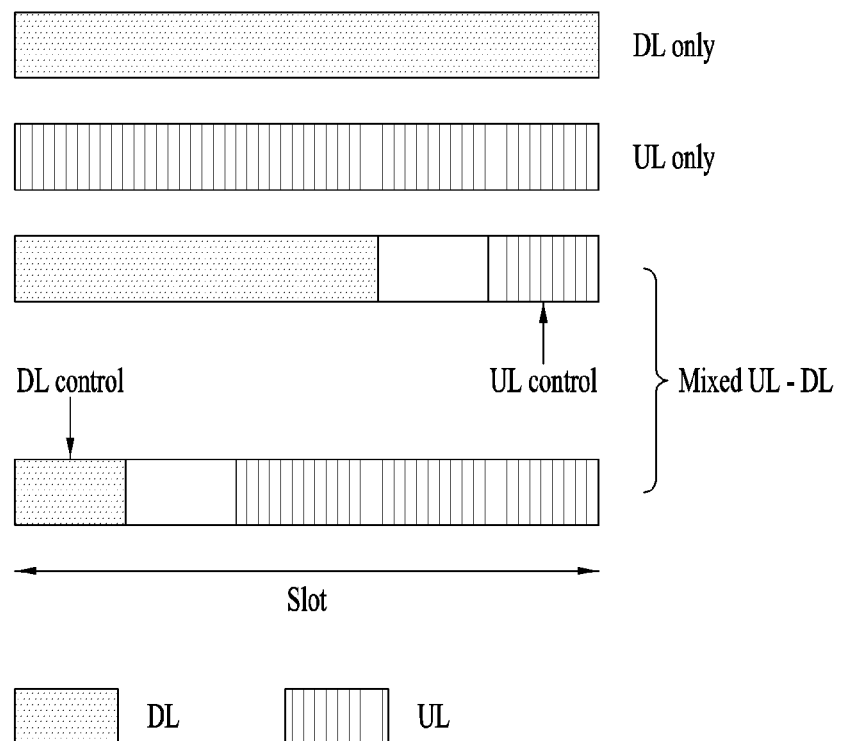

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
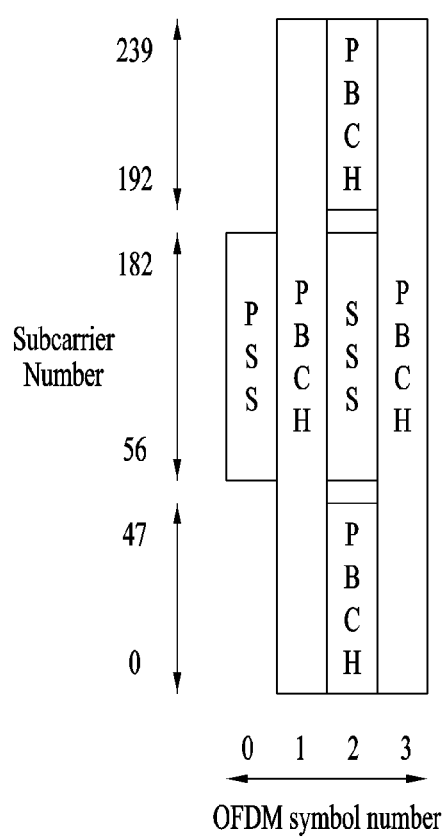
FIGS. 6, 7, 8, and 9 are diagrams illustrating the composition of a synchronization signal/physical broadcast channel (SS/PBCH) block and a method of transmitting an SS/PBCH block.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| 1st step | PSS | SS/PBCH block (SSB) symbol timing acquisition Cell ID detection within a cell ID group (3 hypothesis) |

TABLE 3-continued

| Type of Signals | | Operations |
| --- | --- | --- |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/ Search space configuration |
| $5^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
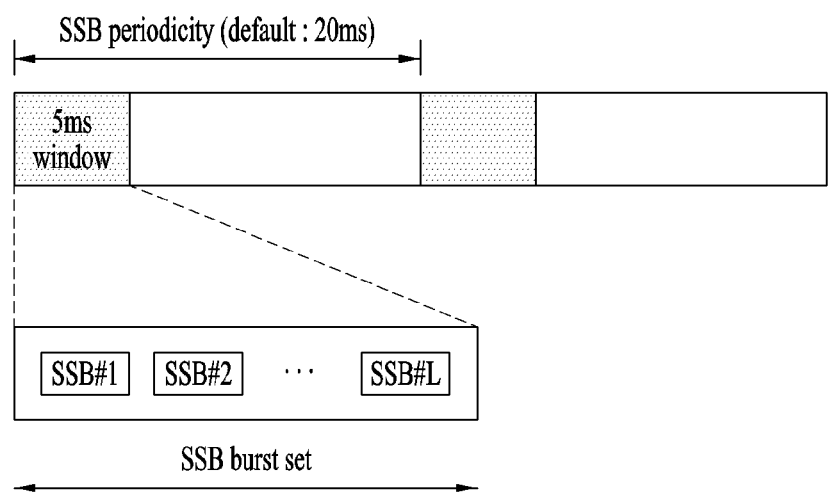

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 8:
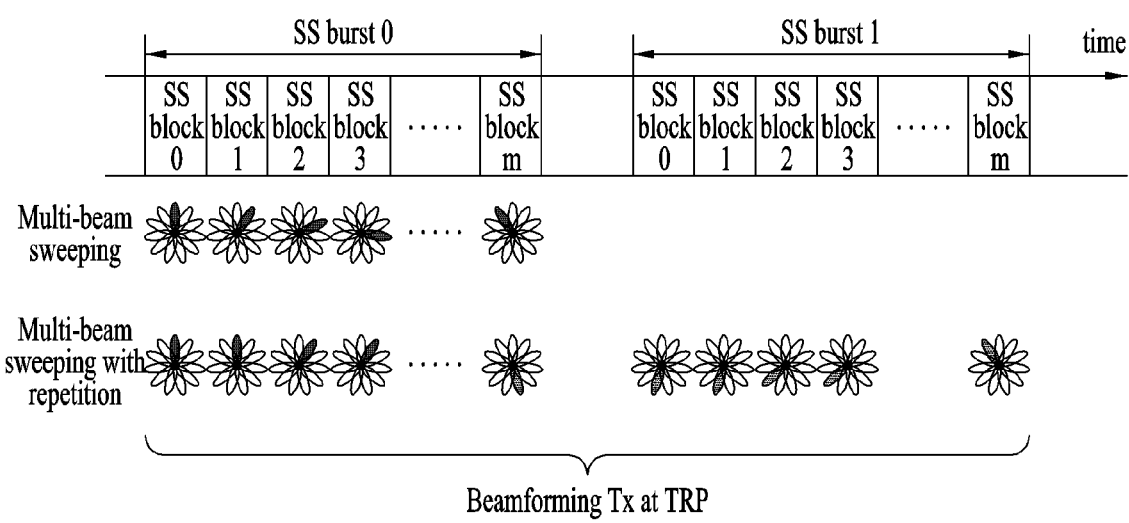

FIG. 8 illustrates exemplary multi-beam transmission of SSBs.

Figure 10:
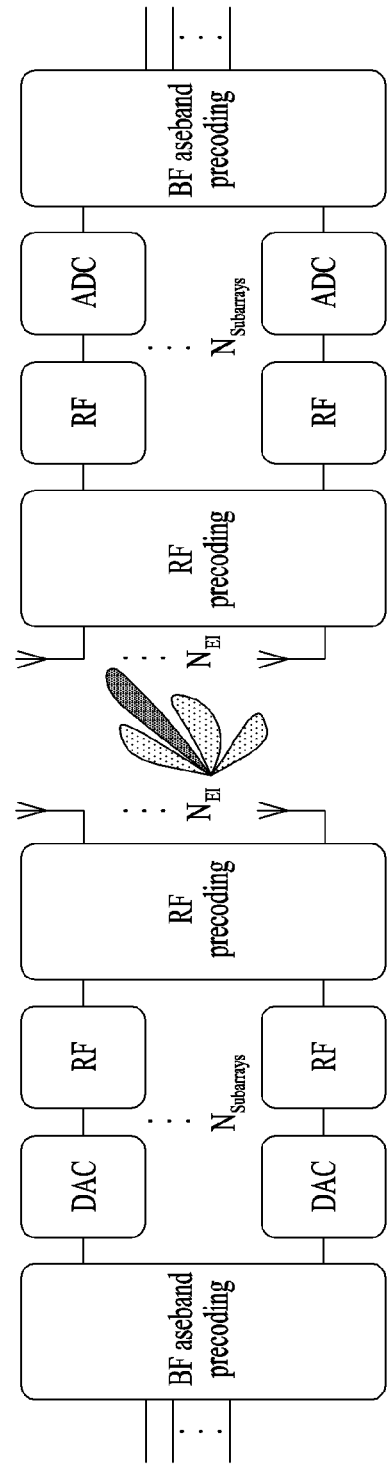
FIG. 10 is a diagram illustrating analog beamforming in the NR system.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4
For frequency range from 3 GHz to 6 GHz, maximum number of beams=8
For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Figure 9:
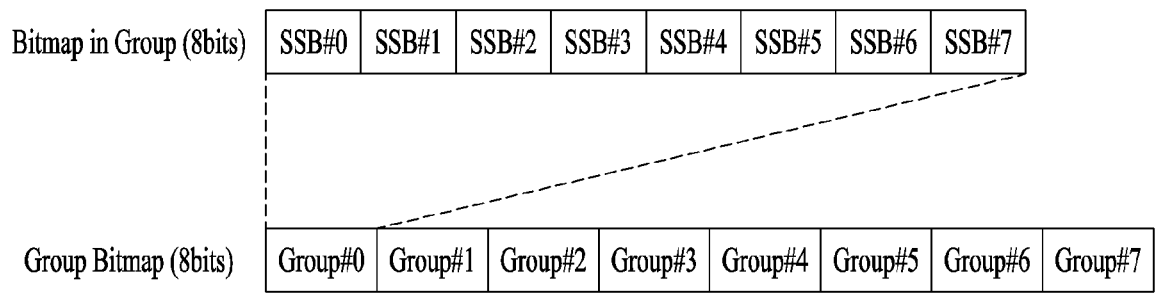

FIG. 9 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

FIG. 10 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 11:
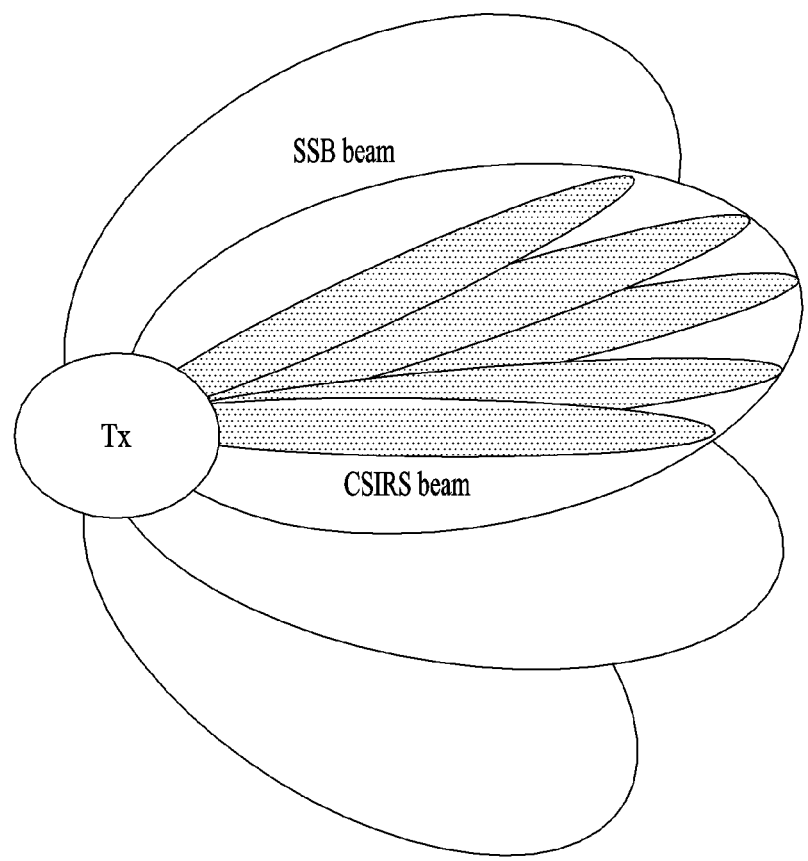
FIGS. 11, 12, 13, 14, and 15 are diagrams illustrating beam management in the NR system.

FIG. 11 is a diagram illustrating exemplary BF using an SSB and a CSI-RS.

Referring to FIG. 11, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 12:
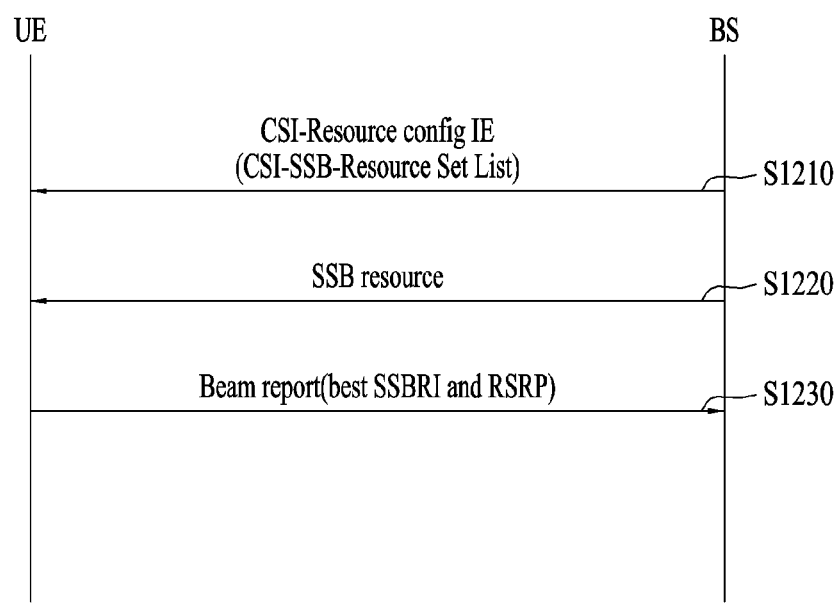

FIG. 12 is a diagram illustrating a signal flow for an exemplary DL BM process using an SSB.

An SSB-based beam report is configured during CSI/beam configuration in RRC CONNECTED mode.

A UE receives a CSI-ResourceConfig information element (IE) including CSI-SSB-ResourceSetList for SSB resources used for BM from a BS (S1210). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S1220).

When CSI-RS reportConfig related to an SSBRI and RSRP reporting has been configured, the UE reports a best SSBRI and an RSRP corresponding to the best SSBRI to the BS (S1230). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 13:
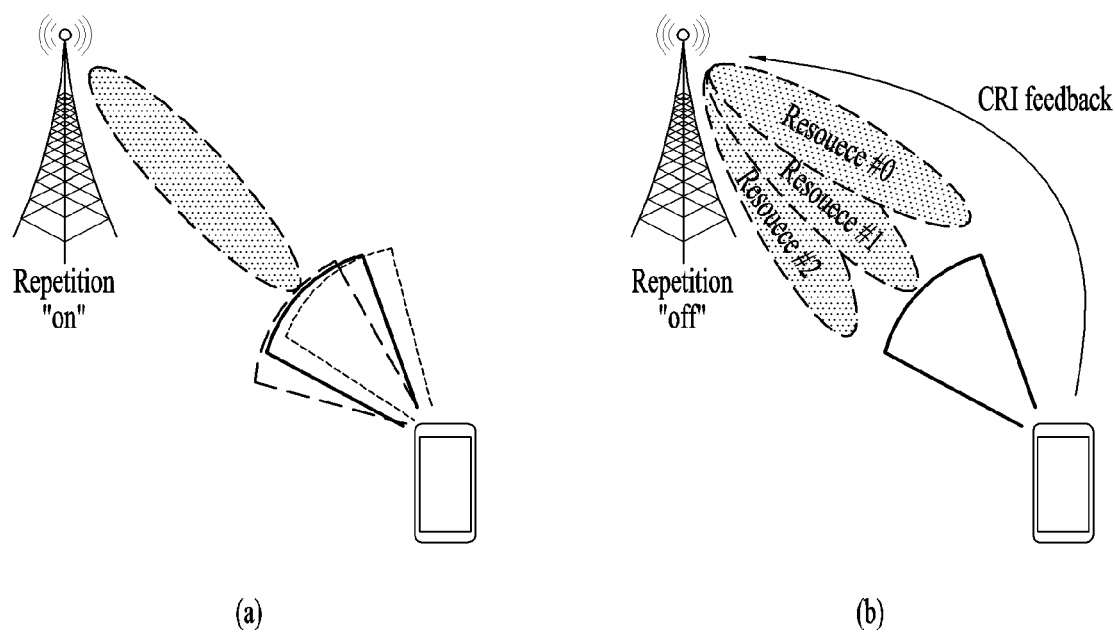

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 13 illustrates another exemplary DL BM process using a CSI-RS.

FIG. 13(a) illustrates an Rx beam refinement process of a UE, and FIG. 13(b) illustrates a Tx beam sweeping process of a BS. Further, FIG. 13(a) is for a case in which Repetition is set to 'ON', and FIG. 13(b) is for a case in which Repetition is set to 'OFF'.

Figure 14:
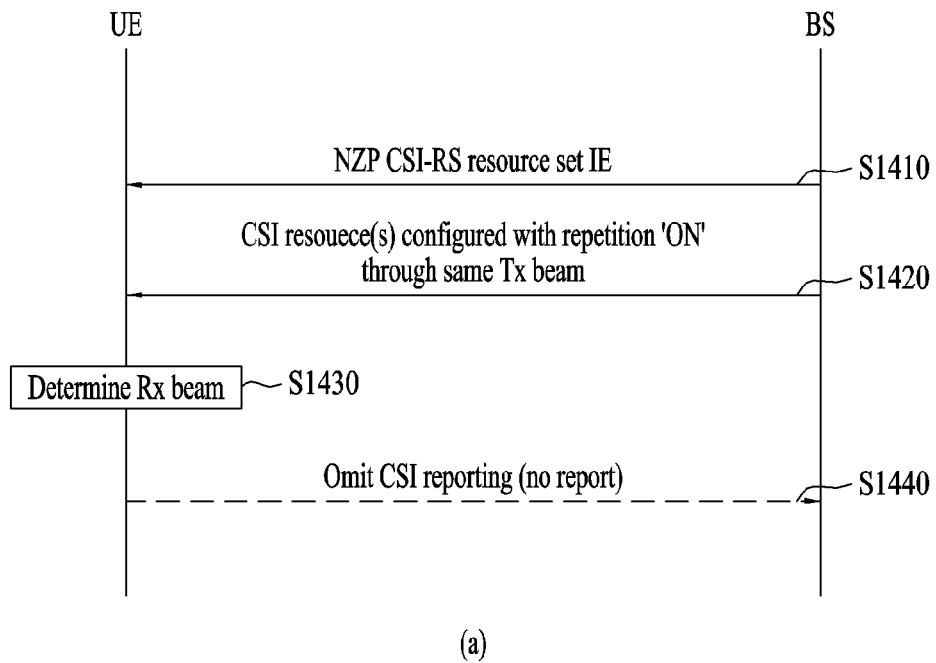
Figure 14:
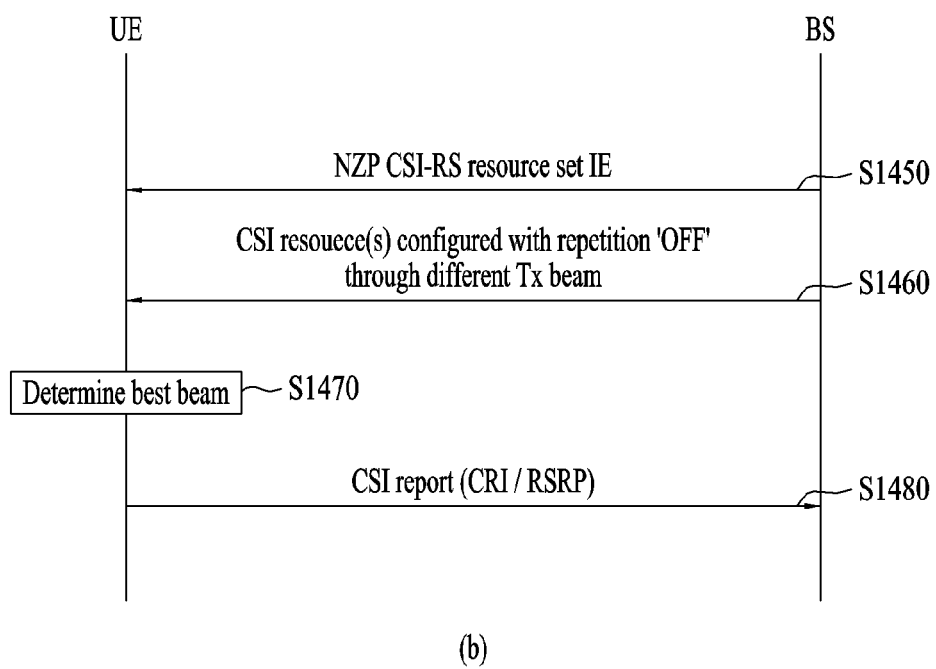

With reference to FIGS. 13(a) and 14(a), an Rx beam determination process of a UE will be described below.

FIG. 14(a) is a diagram illustrating a signal flow for an exemplary Rx beam determination process of a UE.

The UE receives an NZP CSI-RS resource set IE including an RRC parameter 'Repetition' from a BS by RRC signaling (S1410). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1420).

The UE determines its Rx beam (S1430).

The UE skips CSI reporting (S1440). That is, the UE may skip CSI reporting, when the RRC parameter 'Repetition' is set to 'ON'.

With reference to FIGS. 13(b) and 14(b), a Tx beam determination process of a BS will be described below.

FIG. 14(b) is a diagram illustrating an exemplary Tx beam determination process of a BS.

A UE receives an NZP CSI-RS resource set IE including an RRC parameter 'Repetition' from the BS by RRC signaling (S1450). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1460).

The UE selects (or determines) a best beam (S1470).

The UE reports the ID (e.g., CRI) of the selected beam and related quality information (e.g., an RSRP) to the BS (S1480). That is, the UE reports a CRI and an RSRP corresponding to the CRI, when a CSI-RS is transmitted for BM.

Figure 15:
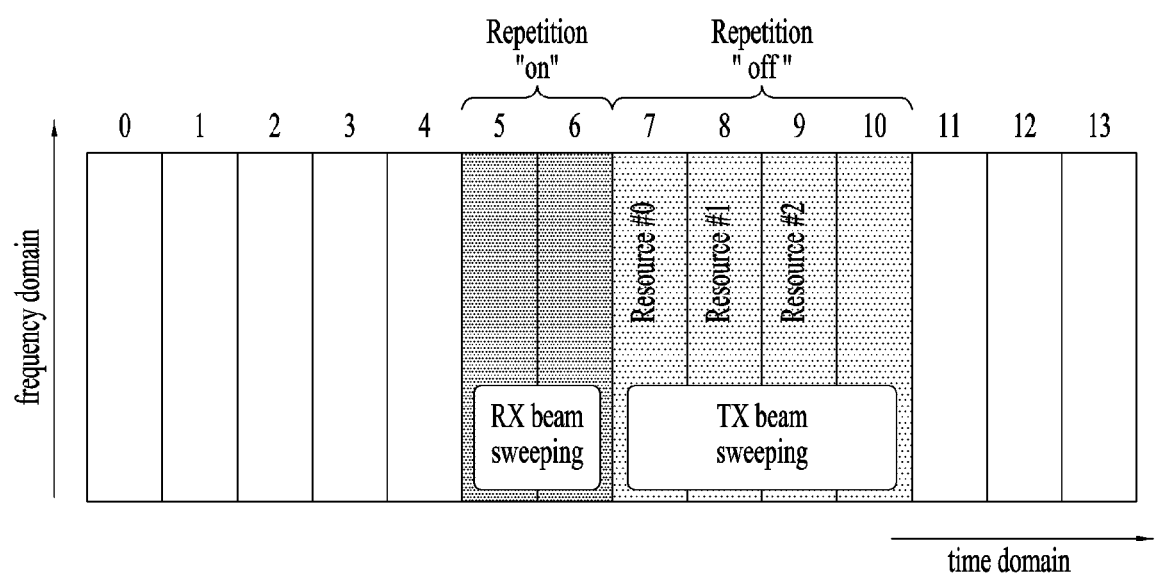

FIG. 15 is a diagram illustrating exemplary resource allocation in the time and frequency domains, which is related to the operation of FIG. 13.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 4 describes an example of a TCI-State IE. The TC-State IE is related to a QCL type corresponding to one or two DL RSs.

TABLE 4

-- ASN1START-- TAG-TCI-STATE-STARTTCI-State ::= SEQUENCE { tci-StateId TCI-StateId, qcl-Type1 QCL-Info, qcl-Type2 QCL-Info OPTIONAL,-- Need R ... }QCL-Info ::= SEQUENCE { cell ServCellIndex OPTIONAL,-- Need R bwp-Id BWP-Id OPTIONAL,-- Cond CSI-RS-Indicated referenceSignal CHOICE { csi-rs NZP-CSI-RS-ResourceId, ssb SSB-Index }, qcl-Type ENUMERATED {typeA, typeB, typeC, typeD},...}-- TAG-TCI-STATE-STOP-- ASN1STOP In Table 4, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'gel-Type' included in QCL-Info and may have one of the following values.

'QCl-TypeA': {Doppler shift, Doppler spread, average delay, delayspread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NIP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA IRS, and apply an Rx beam used to receive a QCL-Type D SSB for reception of the NZP CSI-RS.

CSI Feedback

In the 3GPP LTE(-A) system, it is defined that a UE reports CSI to a BS. CSI generically refers to information representing the quality of a radio channel (or link) established between a UE and an antenna port. For example, the CSI may include a rank indicator (RI), a precoding matrix indicator (PMI), and a channel quality indicator (CQI). The RI is information about the rank of a channel, meaning the number of streams that the UE receives in the same time-frequency resources. Because the RI depends on the long-term fading of the channel, the UE feeds back the RI to the BS, with a longer periodicity than the PMI and the CQI. The PMI is a value reflecting a channel space characteristic, indicating a UE-preferred precoding index based on a metric such as a signal to interference and noise ratio (SINR). The CQI is a value indicating the strength of a channel, generally referring to a reception SINR that is obtainable when the BS uses the PMI.

In the 3GPP LTE(-A) system, the BS may configure a plurality of CSI processes for the UE and receive a report for each process. A CSI process includes a CSI-RS for measurement of the quality of a signal from the BS and a CSI-interference measurement (CSI-IM) resource for interference measurement.

Reference Signal Virtualization

In the NR system, it is possible to transmit a PDSCH only in one analog beam direction at one time point by analog BF. Accordingly, only a small number of UEs located in the direction may receive data from the BS. Therefore, when needed, data may be transmitted simultaneously to multiple UEs in different analog beam directions by setting different analog beam directions for different antenna ports.

Figure 16:
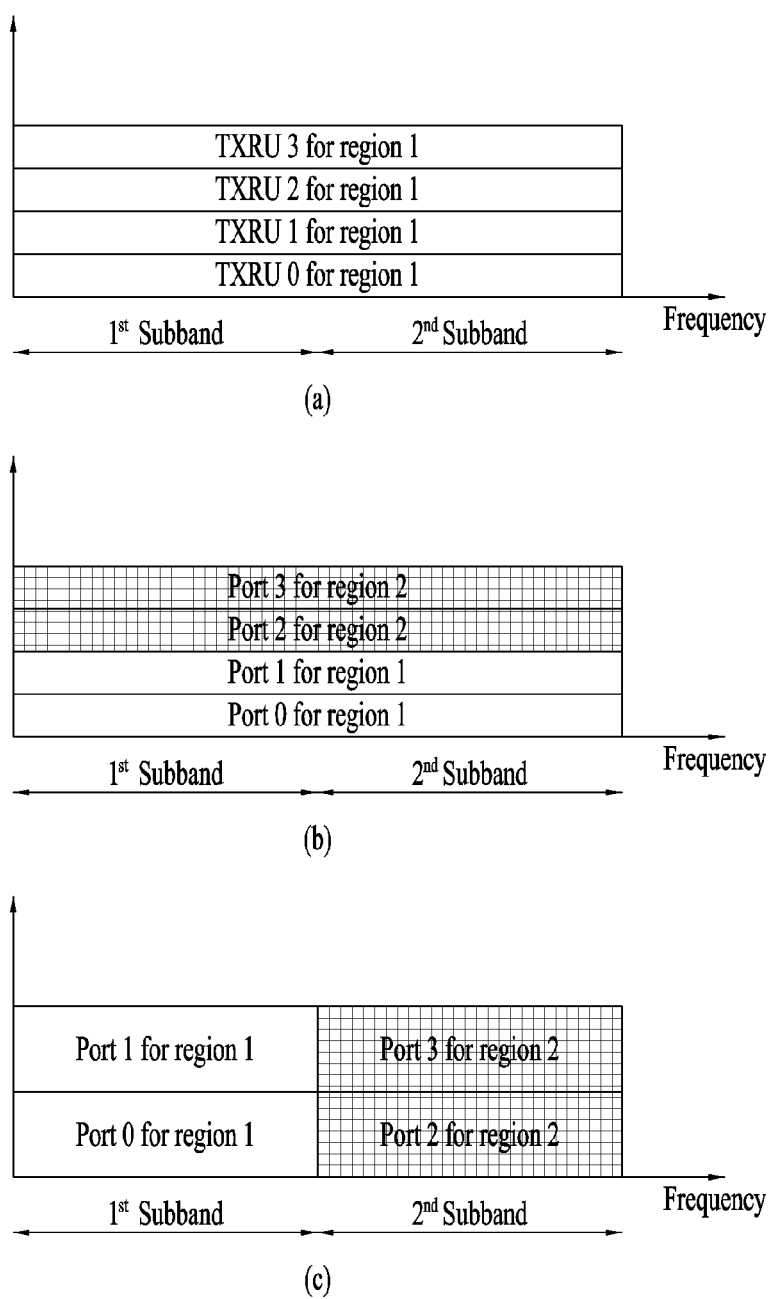
FIG. 16 is a diagram illustrating reference signal (RS) virtualization based on analog beamforming.

FIG. 16 is a diagram illustrating a structure in which a TXRU is connected to each of four sub-arrays obtained by dividing 256 antenna elements into 4 parts. When each sub-array includes a total of 64 (8×8) antenna elements in the form of a two-dimensional (2D) array, one analog BF may cover a region defined by a horizontal angle of 15 degrees and a vertical angle of 15 degrees. That is, a region to be serviced by the BS may be divided into a plurality of regions, and one service may be implemented at one time by one analog BF.

The following description is based on the assumption that CSI-RS antenna ports are mapped to TXRUs in a one-to-one correspondence. Accordingly, the antenna ports and the TXRUs may have the same meaning in the following description.

When all TXRUs (antenna ports or sub-arrays) have the same analog BF direction as illustrated in FIG. 16(a), the throughput of a corresponding region may be increased by forming a digital beam with a higher resolution. Further, the throughput of the region may be increased by increasing the rank of transmission data for the region.

When each TXRU (antenna port or sub-array) has a different analog BF direction as illustrated in FIG. 16(b), data may be transmitted in one subframe simultaneously to UEs distributed over a wider area. For example, two of four antenna ports may be used to transmit a PDSCH to UE1 located in region 1, and the other two antenna ports may be used to transmit a PDSCH to UE2 located in region 2, as illustrated in FIG. 16(b).

FIG. 16(b) illustrates an example of multiplexing PDSCH1 transmitted to UE1 and PDSCH2 transmitted to UE2 in spatial division multiplexing (SDM). In contrast, PDSCH1 for UE1 and PDSCH2 for UE2 may be transmitted in frequency division multiplexing (FDM), as illustrated in FIG. 16(c).

As noted from FIG. 16, a preferred scheme between the scheme of servicing one region using all antenna ports and the scheme of simultaneously servicing a plurality of regions using antenna ports separately may be changed according to a rank and a modulation and coding scheme (MCS) serviced to a UE to maximize a cell throughput. Further, the preferred scheme may be changed according to the amount of data to be transmitted to each UE.

The BS calculates a cell throughput or a scheduling metric that may be achieved when servicing one region with all antenna ports, and a cell throughput or a scheduling metric that that may be achieved when servicing a plurality of regions using the antenna ports separately.

The BS selects a final transmission scheme by comparing the cell throughputs or scheduling metrics that may be achieved from the schemes. As a result, the number of antenna ports involved in PDSCH transmission may be changed in each subframe. To calculate a transmission MCS for a PDSCH according to the number of antenna ports and reflect the MCS in a scheduling algorithm, the BS needs to receive a suitable CSI feedback from a UE.

Now, a description will be given of a method of receiving RSs at a UE, when two RSs are multiplexed according to the present disclosure.

In the NR system, the CSI-RS may serve various usages including CSI acquisition, BM, time-frequency tracking, radio resource management (RRM), and radio link management (RLM). For each usage, there is a need for determining whether to allow simultaneous transmission of two or more CSI-RSs (or a CSI-RS and an SS/PBCH block) and defining a related UE operation. It is important for a slot including 14 symbols to determine whether to allow simultaneous transmission of two or more CSI-RSs and define a related UE operation. Particularly for a mini-slot including 2, 5 or 7 symbols or a non-slot in which two or more CSI-RS resources or an SS/PBCH block and a CSI-RS resource are transmitted unavoidably in FDM, the need for determining whether to allow simultaneous transmission of the two or more CSI-RSs or the CSI-RS and the SS/PBCH block and defining a related UE operation is pressing.

Figure 17:
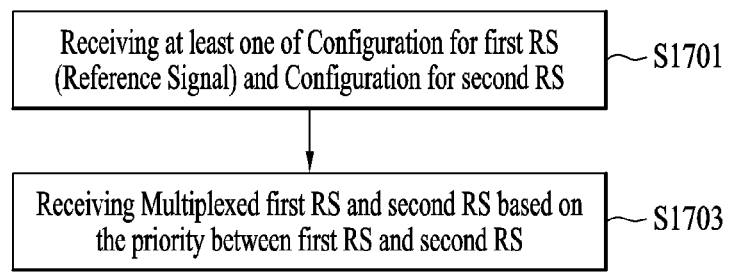
FIGS. 17, 18 and 19 are diagrams illustrating operations of a user equipment (UE), a base station (BS), and a network according to an embodiment of the present disclosure.
Figure 18:
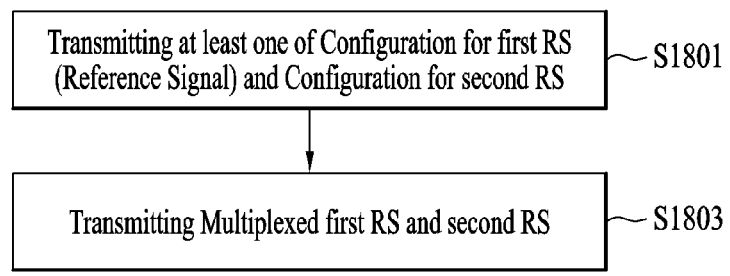
Figure 19:
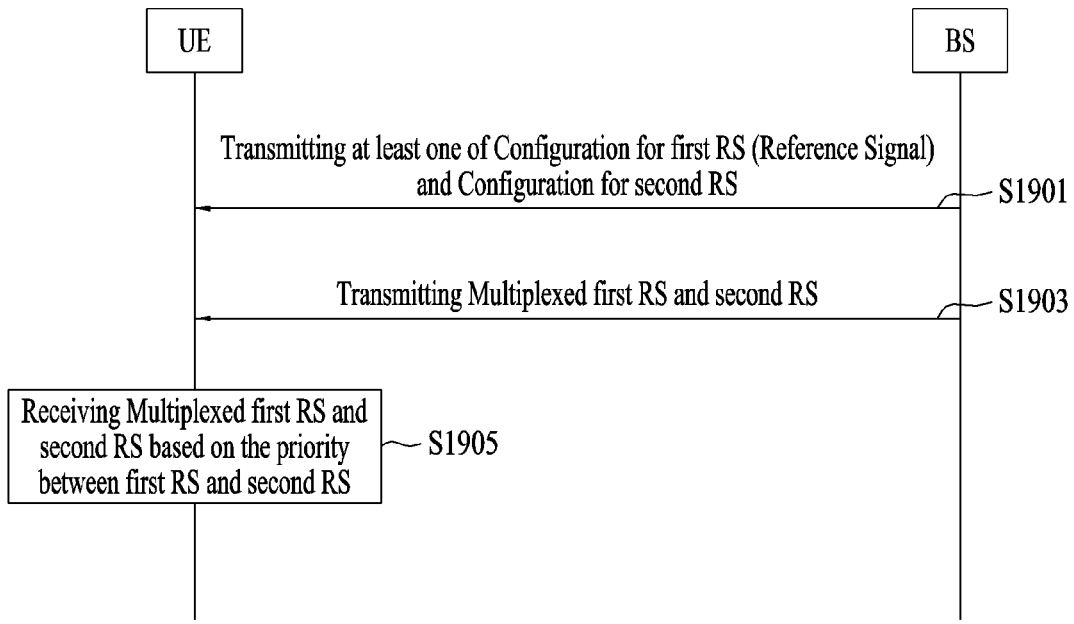

FIGS. 17, 18 and 19 are diagrams illustrating operations of a UE, a BS, and a network according to an embodiment of the present disclosure.

With reference to FIG. 17, a UE operation according to an embodiment of the present disclosure will be described below.

Referring to FIG. 17, the UE receives at least one of a configuration for a first RS or a configuration for a second RS (S1701). One of the first RS and the second RS may be a CSI-RS, and the other RS may be an SS/PBCH block or another CSI-RS which has a different configuration from that of the CSI-RS.

Further, when the first RS and/or the second RS is a CSI-RS, the configuration for the CSI-RS may be a configuration indicating 'ON/OFF' of a parameter related to repetition of the CSI-RS.

Upon receipt of the configurations, the UE may receive the first RS and the second RS which have been multiplexed from a BS based on the priorities of the first RS and the second RS (S1703). The first RS and the second RS may be received in FDM or SDM, and the priorities may be predefined according to embodiments described later or configured by higher-layer signaling and/or physical-layer signaling from the BS.

With reference to FIG. 18, a BS operation will be described below. Referring to FIG. 18, the BS transmits at least one of a configuration for a first RS or a configuration for a second RS (S1801). One of the first RS and the second RS may be a CSI-RS, and the other RS may be an SS/PBCH block or another CSI-RS which has a different configuration from that of the CSI-RS.

Further, when the first RS and/or the second RS is a CSI-RS, the configuration for the CSI-RS may be a configuration indicating 'ON/OFF' of a parameter related to repetition of the CSI-RS.

Subsequently, the BS may transmit the first RS and the second RS which have been multiplexed based on the transmitted configurations (S1803). The first RS and the second RS may be transmitted in FDM or SDM.

With reference to FIG. 19, operations of a UE and a BS from the viewpoint of a network will be described below. Referring to FIG. 19, the BS transmits at least one of a configuration for a first RS or a configuration for a second RS (S1901). One of the first RS and the second RS may be a CSI-RS, and the other RS may be an SS/PBCH block or another CSI-RS which has a different configuration from that of the CSI-RS.

Further, when the first RS and/or the second RS is a CSI-RS, the configuration for the CSI-RS may be a configuration indicating 'ON/OFF' of a parameter related to repetition of the CSI-RS.

Subsequently, the BS may transmit the first RS and the second RS which have been multiplexed based on the transmitted configurations (S1903). The first RS and the second RS may be transmitted in FDM or SDM.

The UE may receive the multiplexed first RS and second RS from the BS based on the priorities of the first RS and the second RS (S1905). The priorities may be predefined according to embodiments described later or configured by higher-layer signaling and/or physical-layer signaling from the BS.

The CSI-RS configuration-based prioritization mentioned before with reference to FIGS. 17, 18 and 19 will be described below.

CSI-RS resources for BM may be identified depending on whether a higher-layer parameter (RRC parameter) or CSI-RS resource set IE, 'CSI-RS-ResourceRep' indicating repeated use of the same beam for a specific CSI-RS resource set in the time domain at a BS is set, as described before with reference to FIGS. 10 to 15. CSI-RS-ResourceRep represents repetition, which may be set to 'ON' or 'OFF'.

Repeated use of the same beam at the BS may mean transmission of CSI-RS resources in different symbols in the same spatial domain (e.g., the same DL spatial domain transmission filter). That is, Repetition 'ON' may mean transmission of CSI-RS resources mapped to a plurality of different symbols in the same spatial domain. Accordingly, Repetition 'OFF' may mean non-transmission of CSI-RS resources mapped to a plurality of different symbols in the same spatial domain.

The higher-layer parameter or the CSI-RS resource set IE may include all IEs related to the CSI-RS resource set.

For example, the CSI-RS resource set IE may be an NZP-CSI-RS resource set IE. Further, the parameter indicating Repetition 'ON'/'OFF' is not limited to the name 'CSI-RS-ResourceRep' and any parameter indicating Repetition 'ON'/'OFF' may correspond to 'CST-RS-ResourceRep'.

In the following embodiment, a panel may refer to a panel on which an antenna for transmitting and receiving various wireless signals is installed. For example, one TXRU may form one panel. In other words, a plurality of antenna elements mapped to one TXRU may constitute one panel, and such a single panel may perform only one transmission/reception operation at a given time point. Accordingly, a plurality of panels are required for simultaneous transmission/reception.

However, the present disclosure is not limited thereto, and a plurality of TXRUs may constitute one panel. The panel may be configured in software as well as in hardware.

For CSI-RS resources for Which Repetition 'OFF' is set, channels for a plurality of Tx beams should be measured with the same Rx beam, whereas for CSI-RS resources for which Repetition 'ON' is set, Rx beam sweeping should be performed for the same Tx beam.

Accordingly, a UE having a single panel or a UE receiving data at the same time by one Rx beam is not capable of simultaneously receiving CSI-RS resources of a CSI-RS resource set configured with Repetition 'OFF' and CSI-RS resources of a CSI-RS resource set configured with Repetition 'ON'. This is because the simultaneous receptions are contradictory operations to the UE having a single panel.

In this context, a UE operation for the case where a UE is configured to simultaneously receive CSI-RS resources of a CSI-RS resource set configured with Repetition 'OFF' and CSI-RS resources of a CSI-RS resource set configured with Repetition 'ON' will be described below.

Embodiment 1-1

The UE assigns a higher priority to CSI-RS resources of a CSI-RS resource set configured with Repetition 'OFF'. That is, the CSI-RS resources of the CSI-RS resource set configured with Repetition 'OFF' may override CSI-RS resources of a CSI-RS resource set configured with Repetition 'ON'.

Alternatively, an Rx beam sweeping operation may not be performed for the CSI-RS resources of the CSI-RS resource set configured with Repetition 'ON'. In the case of Repetition 'ON', because the BS uses the same beam, the UE is likely not to report any channel information.

In contrast, for a CSI-RS configured with Repetition 'OFF' and thus subjected to Tx beam sweeping, the UE may report a CRI/RSRP according to Tx beam sweeping for one Rx beam. Therefore, it may be appropriate to assign a higher priority to the CSI-RS resource set configured with Repetition 'OFF'.

Embodiment 1-2

A higher priority may be assigned to a CSI-RS configured with Repetition 'ON'. In other words, the UE may perform only an Rx beam sweeping operation, ignoring Tx beam sweeping of the BS and CRI/RSRP reporting.

The qualities of beams from the BS that performs Tx beam sweeping for one UE may be mostly similar due to a specific Rx beam or an ambient fading environment of the UE. Then the UE may preferably assign a higher priority to Rx beam sweeping of the UE, ignoring Tx beam sweeping of the BS.

That is, it may be preferable for channel reporting to allow the UE to perform Rx beamforming for a specific Tx beam of the BS and thus select an Rx beam in a good channel environment. In contrast, in the case where the BS performs Tx beam sweeping and the UE uses one Rx beam, when the directions of beams in the Tx beam sweeping of the BS are all misaligned with the direction of the Rx beam of the UE, the UE has already been placed in a situation where CSI measurement is difficult. Accordingly, it may be preferable to give priority to Repetition 'ON'.

Embodiment 1-3

When CSI-RS resources of a CSI-RS resource set configured with Repetition 'OFF' and CSI-RS resources of a CSI-RS resource set configured with Repetition 'ON' are simultaneously transmitted/received, the BS may indicate/configure the priorities of the CSI-RS resource set configured with Repetition 'OFF' and the CSI-RS resource set configured with Repetition 'ON' by higher-layer signaling and/or physical-layer signaling. That is, the BS may change the priorities depending on situations. The operation according to Embodiment 1-3 may also be applied to a situation for which the afore-described Embodiment 1-1 or Embodiment 1-2 is predefined. That is, even though a configuration that assigns a higher priority to Repetition 'ON' or Repetition 'OFF' is predefined, the BS may change the predefined priority configuration by higher-layer signaling and/or physical-layer signaling.

Embodiment 1-4

When CSI-RS resources of a CSI-RS resource set configured with Repetition 'OFF' and CSI-RS resources of a CSI-RS resource set configured with Repetition 'ON' are transmitted with different numerologies, the UE may assume that there is no priority difference between the CSI-RS resource sets irrespective of Repetition 'ON' or 'OFF'. That is, when CSI-RS resources of a CSI-RS resource set configured with Repetition 'OFF' and CSI-RS resources of a CSI-RS resource set configured with Repetition 'ON' are transmitted with different numerologies, the UE may ignore the priorities of Repetition 'ON' and Repetition 'OFF' predefined or indicated by the BS.

For example, when CSI-RS resources of a CSI-RS resource set configured with Repetition 'OFF' and CSI-RS resources of a CSI-RS resource set configured with Repetition 'ON' are transmitted respectively in two component carriers (CCs) with two different SCSs, which are aggregated in a carrier aggregation (CA) situation, the UE may ignore the priorities of Repetition 'ON' and Repetition 'OFF' predefined or indicated by the BS.

Figure 20:
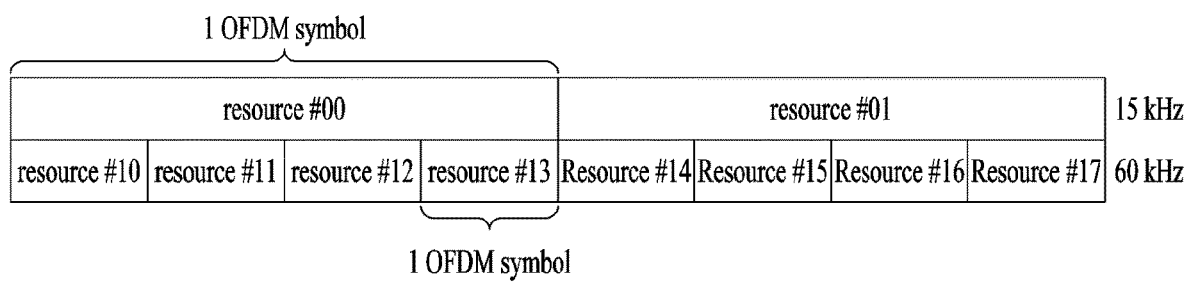
FIGS. 20 and 21 are diagrams illustrating embodiments of receiving RSs which have been multiplexed with each other according to the present disclosure.

Specifically, referring to FIG. 20, it is assumed that CSI-RS resource #00 and CSI-RS resource #01 are defined as a CSI-RS resource set configured with Repetition 'OFF' and CSI-RS resource #10 and CSI-RS resource #17 are defined as a CSI-RS resource set configured with Repetition 'ON'.

In this case, the UE may measure the RSRPs of two different Tx beams by sweeping up to four Rx beams and select a best Rx beam and/or a best Tx beam based on the RSRPs.

On the contrary, it is assumed that CSI-RS resource #00 and CSI-RS resource #01 are defined as a CSI-RS resource set configured with Repetition 'ON' and CSI-RS resource #10 and CSI-RS resource #17 are defined as a CSI-RS resource set configured with Repetition 'OFF'. In this case, the UE may test up to two Rx beams for up to four Tx beams of the BS. That is, the number of BS beams and/or UE beams available for testing may be affected more by the difference between the SCSs of the two CCs than by the number of configured CSI-RS resources.

The operation based on Embodiment 1-4 is also applicable to a situation in which Repetition 'ON' and Repetition 'OFF' are prioritized according to the afore-described Embodiment 1-1 to Embodiment 1-3. That is, even though Repetition 'ON' and Repetition 'OFF' are prioritized according to Embodiment 1-1 to Embodiment 1-3, when CSI-RS resources of a CSI-RS resource set configured with Repetition 'OFF' and CSI-RS resources of a CSI-RS resource set configured with Repetition 'ON' are transmitted with different numerologies, the UE may assume that there is no priority difference between the CSI-RS resource sets irrespective of Repetition 'ON' and Repetition 'OFF'.

In the NR system, up to 64 SS/PBCH blocks may be transmitted for 5 ms according to the numerology of an SCS. Therefore, it may be difficult to always avoid simultaneous transmission/reception of an SS/PBCH block and a channel such as an RS including the CSI-RS and a control resource set (CORESET). Accordingly, it is necessary to define a UE operation in the case of simultaneous transmission/reception of an SS/PBCH block and a CSI-RS.

Therefore, a UE operation in the case of simultaneous reception of CSI-RS resources included in a CSI-RS resource set for a CSI-RS for BM, configured with Repetition 'OFF' and an SS/PBCH block in FDM will be described below.

That is, in SS/PBCH block-based BM, a P1 operation for determining a suitable BS Tx beam and a suitable UE Rx beam or a P3 operation for Rx beam sweeping at a fine level for four symbols included in an SS/PBCH block may be performed. In other words, the UE may perform Rx beam sweeping to detect a best beam in the SS/PBCH block. However, to receive a CSI-RS configured with Repetition 'OFF', the UE should not perform Rx beam sweeping. Therefore, when an SS/PBCH block and a CSI-RS configured with Repetition 'OFF are transmitted in FDM, a UE having a single panel faces contradiction in operation because the UE is not capable of simultaneously performing the two operations. A UE operation for this case needs to be defined.

When an SS/PBCH block and CSI-RS resources are multiplexed in FDM, the CSI-RS resources are preferably included in an RB with a higher or lower index than an RB carrying the SS/PBCH block.

Considering that the SS/PBCH block is allocated to 20 RBs, allocation of the CSI-RS resources in both higher and lower frequencies than the frequency of the SS/PBCH block is not preferable in terms of CSI-RS detection performance. Instead, allocation of the CSI-RS resources in one of higher and lower frequencies than the frequency of the SS/PBCH block may be preferable for detection of all CSI-RS resources at the UE.

Embodiment 2-1

The UE assumes that a CSI-RS received simultaneously with an SS/PBCH block is in CSI-RS resources configured with Repetition 'ON' in a CSI-RS resource set. In other words, even though the CSI-RS resource set is configured with Repetition 'OFF', the UE assumes that the BS will not perform Tx beam sweeping for the CSI-RS transmitted simultaneously with the SS/PBCH block.

Embodiment 2-2

The UE may assume that an SS/PBCH block transmitted simultaneously with CSI-RS resources of a CSI-RS resource set configured with Repetition 'OFF' overrides a CSI-RS. In other words, the UE may assign a higher priority to the SS/PBCH block, ignoring the transmission of the CSI-RS configured with Repetition 'OFF'.

In Embodiment 2-1 and Embodiment 2-2, despite reception of a CSI-RS configured with Repetition 'OFF', the UE may perform Rx beam sweeping to detect a best beam through an SS/PBCH block and thus operate without contradiction even though the UE has a single panel.

Embodiment 2-3

The UE calculates an average channel state without reflecting a channel measurement such as an L1-RSRP and/or reference signal received quality (RSRQ) of CSI-RS resources of a CSI-RS resource set configured with Repetition 'OFF', which have been received simultaneously with an SS/PBCH block. In this case, even though the UE has received a CSI-RS, the UE neither reflects the CSI-RS in a channel state measurement nor reports CSI to the BS. Thus, the UE needs to calculate/report only a SS/PBCH block-based measurement, thereby avoiding contradictory operations.

Embodiment 2-4

In preparation (expectation) for setting of Repetition 'ON', the UE may apply Rx beam sweeping to a symbol in which an SS/PBCH block and a CSI-RS are multiplexed in FDM to identify a more appropriate Rx beam. That is, even when receiving CSI-RS resources configured with Repetition 'OFF', the UE may perform an Rx beam sweeping operation as when receiving CSI-RS resources configured with Repetition 'ON'.

Even in Embodiment 2-4, the UE performs Rx beam sweeping despite setting of Repetition 'OFF' for a CSI-RS. Therefore, the problem that the UE should perform contradictory operations may be solved.

Embodiment 2-5

When the UE simultaneously receives CSI-RS resources for BM included in a CSI-RS resource set configured with Repetition 'OFF' and an SS/PBCH block in FDM, the BS may indicate/configure the priorities of a CSI-RS and the SS/PBCH block in advance by higher-layer signaling such as RRC signaling and/or dynamic signaling such as a medium access control (MAC) control element (CE)/DCI to/for the UE in consideration of a network environment. That is, the priorities may be changed according to a situation, and indicated/configured to/for the UE by the BS.

Embodiment 2-5 is applicable together with Embodiment 2-1 to Embodiment 2-4. That is, even though the UE is configured to perform Rx beam sweeping according to Embodiment 2-1 to Embodiment 2-4, when the BS indicates a configuration that assigns a higher priority to a CSI RS configured with Repetition 'OFF' according to Embodiment 2-5, the UE may not perform Rx beam sweeping, assuming that the BS performs Tx beam sweeping.

Particularly, when an aperiodic CSI-RS as a CSI-RS for BM is multiplexed in FDM with an SS/PBCH block, the aperiodic CSI-RS and the SS/PBCH block are highly likely to be transmitted on the same Tx beam in view of the nature of the SS/PBCH block. Therefore, FDM between the aperiodic CSI-RS for BM and the SS/PBCH block may be allowed restrictively only when the aperiodic CSI-RS and the SS/PBCH block are spatially QCLed and the aperiodic CSI-RS is in CSI-RS resources of a CSI-RS resource set configured with Repetition 'ON' and thus requiring Rx beam sweeping.

In this case, fine-level Rx beam sweeping is preferably performed for four symbols included in the SS/PBCH block. For a UE having a single panel or a UE that is not capable of receiving data through multiple Rx beams at the same time, to allow only FDM between an SS/PBCH block and CSI-RS resources configured with Repetition 'ON' may be more important.

However, when the UE has notified the BS that the UE has a plurality of panels or is capable of simultaneously receiving data on multiple Rx beams by separate signaling, simultaneous transmission/reception of an aperiodic CSI-RS for BM configured with Repetition 'OFF' and an SS/PBCH in FDM may be allowed.

Further, when the SCS of a CC carrying an SS/PBCH block is larger than the SCS of a CC carrying a CSI-RS by a predetermined value or more (e.g., 4 times or more) in a CA situation in which the SS/PBCH block and the CSI-RS are transmitted in different CCs, CSI-RS resources and the SS/PBCH block may be multiplexed in FDM regardless of a Repetition 'ON'/'OFF' configuration, and the priorities of the CSI-RS and the SS/PBCH block may be equal. In this case, the UE may therefore receive the CSI-RS and the SS/PBCH block, ignoring predefined or indicated priorities of the CSI-RS and the SS/PBCH block.

Figure 21:
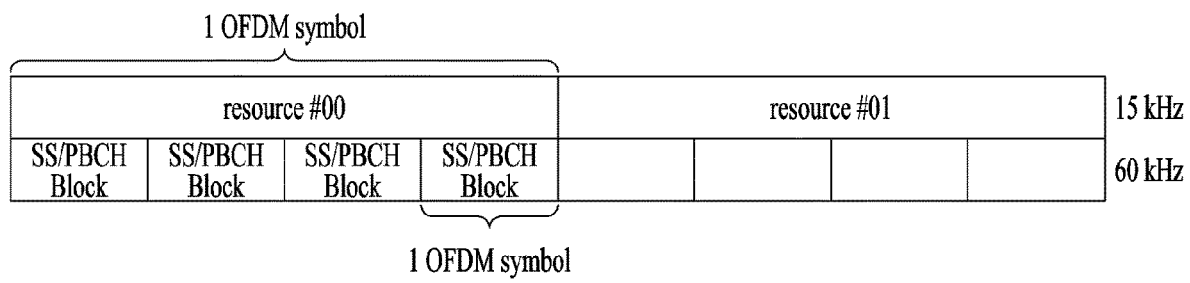

For example, since the BS has a high probability of using the same Tx beam during four OFDM symbols in which the SS/PBCH block is transmitted, when the time period of four OFDM symbols for one SS/PBCH block is equal to one OFDM symbol period during which the CSI-RS is transmitted as illustrated in FIG. 21, the UE may receive the SS/PBCH block on the same Rx beam regardless of Repetition 'ON'/'OFF'.

Only when a higher-layer configuration parameter or IE, CSI-RS-ResourceRep is set to 'ON', that is, Repetition 'ON' indicating that the BS repeatedly uses the same beam in the time domain, RB-level or RE-level FDM between CSI-RS resources for BM and a CSI-RS for CSI acquisition and/or a CSI-RS for time-frequency tracking may be allowed.

On the contrary, only when the parameter CSI-RS-ResourceRep is set to 'OFF', that is, Repetition 'OFF' indicating that the BS performs a Tx beam sweeping operation in the time domain, RB-level or RE-level FDM between CSI-RS resources for BM and a CSI-RS for CSI acquisition and/or a CSI-RS for time-frequency tracking may be allowed.

When Repetition 'OFF' is configured by the higher-layer parameter CSI-RS-ResourceRep, the BS configures different beams for CSI-RS resources for BM which are multiplexed in TDM. In this case, the UE is not capable of accurate channel estimation of a CSI-RS mapped to four or more antenna ports.

On the contrary, if Repetition 'ON' is configured, the BS configures the same beam. Therefore, it may be considered that the UE performs an Rx beam sweeping operation within a range that does not significantly degrade CSI acquisition performance or in a very fine beam direction.

In a hierarchical Rx beam detection scheme, for example, when Rx beam sweeping has already been performed at a coarse level, the UE may perform channel estimation simultaneously with a P3 operation for selecting a better Rx beam at a fine level.

However, when the Rx beam sweeping operation has not been performed at the coarse level, the UE is configured with No Report in the operation P3. Therefore, the UE has only to perform a measurement operation for obtaining channel information implicitly.

When a coordinated multi-point (CoMP) measurement set is configured for a specific UE, that is, when the UE is prepared for a CoMP operation or is indicated to perform the CoMP operation to receive data from one or more neighboring BSs/TRPs, CSI-RS resources for BM included in a CSI-RS resource set configured with Repetition 'OFF' may also be transmitted simultaneously in FDM with a CSI-RS for CSI acquisition.

This is because a specific BS/TRP may perform Tx beam sweeping, and another BS/TRP may indicate CSI acquisition while maintaining the same beam. In this case, the UE may detect a best TX beam for the specific BS/TRP and estimate a channel for the other BS/TRP, while maintaining the same Rx beam.

It may be said that a CSI-RS for time-frequency tracking, which has properties similar to those of the LTE CRS, is more important than a CSI-RS for CSI acquisition and a CSI-RS for BM. That is, the CSI-RS for time-frequency tracking may have priority over the CSI-RS for CSI acquisition and the CSI-RS for BM.

Therefore, when the CSI-RS for time-frequency tracking is multiplexed in FDM with the CSI-RS for CSI acquisition or the CSI-RS for BM, different scrambling IDs may always be assigned to the CSI-RS for time-frequency tracking and the CSI-RS for CSI measurement and/or the CSI-RS for BM, so that the CSI-RS for time-frequency tracking is identified more clearly.

That is, the scrambling ID of CSI-RS resources for time-frequency tracking may be configured cell-specifically/UE-commonly or independently for each UE group so that the scrambling ID is UE group-common, whereas the scrambling ID of the CSI-RS for CSI acquisition and/or the CSI-RS for BM may be configured UE-specifically not to overlap with the scrambling ID for the CSI-RS resources for time-frequency tracking.

On the other hand, when channel information is measured in a CSI-RS for RRM and/or RLM in the NR system, particularly in a frequency band at or above 6 GHz, RSRPs may be measured based on a Tx beam sweeping operation of a BS/TRP. Therefore, the UE may expect or assume that the RRM CSI-RS and/or the RLM CSI-RS may be received simultaneously with a CSI-RS for BM configured with Repetition 'OFF', without expecting or assuming simultaneous reception of the RRM CSI-RS and/or the RLM CSI-RS and a CSI-RS for CSI acquisition.

In other words, the UE may expect to receive the CSI-RS resources of the CSI-RS resource set configured with Repetition 'OFF' simultaneously with the RLM CSI-RS and/or the RRM CSI-RS. On the contrary, the UE does not expect to receive the CSI-RS resources of a CSI-RS resource set configured with Repetition 'ON' simultaneously with the RLM CSI-RS and/or the RRM CSI-RS.

Figure 22:
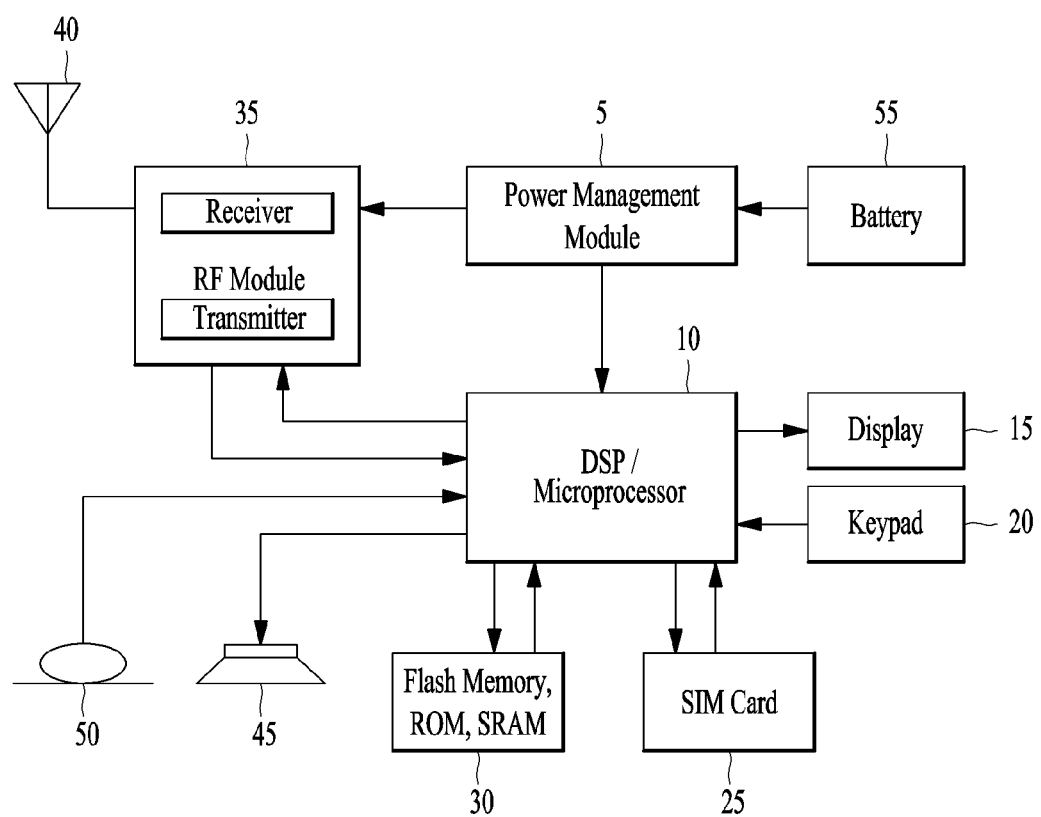
FIG. 22 is a block diagram illustrating components of a wireless device for implementing the present disclosure.

FIG. 22 illustrates an example of a wireless communication device according to an embodiment of the present disclosure.

The wireless communication device illustrated in FIG. 22 may represent a UE and/or a BS according to an embodiment of the present disclosure. However, the wireless communication device of FIG. 22 may be replaced with any of various types of devices such as a vehicle communication system or device, a wearable device, and a laptop, not limited to the UE and/or the BS according to the embodiment of the present disclosure.

In the example of FIG. 22, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 1 to 21. In at least some of the embodiments described with reference to FIGS. 1 to 21, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 22 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

For implementation of the embodiments of the present disclosure, a UE operation in the case of the wireless communication device illustrated in FIG. 22 being a UE according to an embodiment of the present disclosure will be specifically described below. When the wireless communication device is a UE according to an embodiment of the present disclosure, the processor 10 may control the transceiver 35 to receive at least one of a configuration for a first RS and a configuration for a second RS. One of the first RS and the second RS may be a CSI-RS, and the other may be an SS/PBCH block or another CSI-RS having a configuration different from that of the CSI-RS.

When the first RS and/or the second RS is a CSI-RS, the configuration for the RS may be a configuration indicating whether a parameter related to repetition of the CSI-RS is 'ON/OFF'.

The processor 10 that has controlled reception of the configurations may control the transceiver 35 to receive the first RS and the second RS which have been multiplexed from a BS based on the priorities of the first RS and the second RS. In this case, the first RS and the second RS may be received in FDM or SDM, and their priorities may be predefined or configured by higher-layer signaling and/or physical-layer signaling from the BS according to the embodiments of the present disclosure described before with reference to FIGS. 1 to 21.

For implementation of the embodiments of the present disclosure, when the wireless communication device illustrated in FIG. 13 is a BS according to an embodiment of the present disclosure, the processor 10 may control the transceiver 35 to transmit at least one of a configuration for a first RS and a configuration for a second RS to a UE. One of the first RS and the second RS may be a CSI-RS, and the other may be an SS/PBCH block or another CSI-RS having a configuration different from that of the CSI-RS.

When the first RS and/or the second RS is a CSI-RS, the configuration for the RS may be a configuration indicating whether a parameter related to repetition of the CSI-RS is 'ON/OFF'.

Then the processor 10 may control the transceiver 35 to transmit the first RS and the second RS which have been multiplexed based on the transmitted configurations to the UE. In this case, the first RS and the second RS may be transmitted in FDM or SDM.

The embodiments described above are those in which the elements and features of the present disclosure are combined in a predetermined form. Each component or feature shall be considered optional unless otherwise expressly stated. Each component or feature may be implemented in a form that is not combined with other components or features. It is also possible to construct embodiments of the present disclosure by combining some of the elements and/or features. The order of the operations described in the embodiments of the present disclosure may be changed. Some configurations or features of certain implementations may be included in other embodiments, or may be replaced with corresponding configurations or features of other embodiments. It is clear that the claims that are not expressly cited in the claims may be combined to form an embodiment or be included in a new claim by an amendment after the application.

The specific operation described herein as being performed by the BS may be performed by its upper node, in some cases. That is, it is apparent that various operations performed for communication with a UE in a network including a plurality of network nodes including a BS may be performed by the BS or by a network node other than the BS. A BS may be replaced by terms such as a fixed station, a Node B, an eNode B (eNB), an access point, and the like.

Embodiments of the present disclosure may be implemented by various means, for example, hardware, firmware, software or a combination thereof. In the case of hardware implementation, an embodiment of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In a firmware or software configuration, an embodiment of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

INDUSTRIAL APPLICABILITY

While the method and apparatus for transmitting and receiving an RS have been described above in the context of a 5G NewRAT system, the method and apparatus are also applicable to various wireless communication systems other than the 5G NewRAT system.

The invention claimed is:

1. A method of receiving a reference signal (RS) by a user equipment (UE) in a wireless communication system, the method comprising:
   receiving information informing a mode related to repetition of a beam for a channel state information-reference signal (CSI-RS); and
   receiving the CSI-RS and a synchronization signal/physical broadcast channel (SS/PBCH) block which are multiplexed based on the mode,
   wherein, based on a subcarrier spacing for the SS/PBCH block being an integer multiple of a subcarrier spacing for the CSI-RS, the reception priority of the SS/PBCH block is identical to the reception priority of the CSI-RS.

2. The method according to claim 1, wherein the UE performs reception beam sweeping for a plurality of symbols including the SS/PBCH block.

3. The method according to claim 1, wherein the mode is for informing that a base station (BS) does not use the same beam repeatedly to transmit the CSI-RS.

4. The method according to claim 1, wherein the UE includes one antenna panel.

5. The method according to claim 1, wherein channel state measurement is not based on the CSI-RS.

6. The method according to claim 1, wherein the SS/PBCH block and the CSI-RS are multiplexed in frequency division multiplexing (FDM).

7. The method according to claim 1, wherein, based on a signal for a reception priority configuration being received from a BS, the reception priorities of the SS/PBCH block and the CSI-RS are determined based on the received signal.

8. A user equipment (UE) for receiving a reference signal (RS) in a wireless communication system, the UE comprising:
a transceiver; and
at least one processor coupled with the transceiver,
wherein the at least one processor is configured to:
control the transceiver to receive information informing a mode related to repetition of a beam for a channel state information-reference signal (CSI-RS), and
control the transceiver to receive the CSI-RS and a synchronization signal/physical broadcast channel (SS/PBCH) block which are multiplexed based on the mode, and
wherein, based on a subcarrier spacing for the SS/PBCH block being an integer multiple of a subcarrier spacing for the CSI-RS, the reception priority of the SS/PBCH block is identical to the reception priority of the CSI-RS.

9. An apparatus for receiving a reference signal (RS) in a wireless communication system, the apparatus comprising:
a memory; and
at least one processor coupled with the memory,
wherein the at least one processor is configured to:
receive information informing a mode related to repetition of a beam for a channel state information-reference signal (CSI-RS), and
receive the CSI-RS and a synchronization signal/physical broadcast channel (SS/PBCH) block which are multiplexed based on the mode, and
wherein, based on a subcarrier spacing for the SS/PBCH block being an integer multiple of a subcarrier spacing for the CSI-RS, the reception priority of the SS/PBCH block is identical to the reception priority of the CSI-RS.

10. A method of transmitting a reference signal (RS) by a base station (BS) in a wireless communication system, the method comprising:
transmitting information informing a mode related to repetition of a beam for a channel state information-reference signal (CSI-RS); and
transmitting the CSI-RS and a synchronization signal/physical broadcast channel (SS/PBCH) block which are multiplexed based on the mode,
wherein, based on a subcarrier spacing for the SS/PBCH block being an integer multiple of a subcarrier spacing for the CSI-RS, the reception priority of the SS/PBCH block is identical to the reception priority of the CSI-RS.

11. A base station (BS) for transmitting a reference signal (RS) in a wireless communication system, the BS comprising:
a transceiver; and
at least one processor coupled to the transceiver,
wherein the at least one processor is configured to:
control the transceiver to transmit information informing a mode related to repetition of a beam for a channel state information-reference signal (CSI-RS), and
control the transceiver to transmit the CSI-RS and a synchronization signal/physical broadcast channel (SS/PBCH) block which are multiplexed based on the mode, and
wherein, based on a subcarrier spacing for the SS/PBCH block being an integer multiple of a subcarrier spacing for the CSI-RS, the reception priority of the SS/PBCH block is identical to the reception priority of the CSI-RS.

* * * * *